US008565780B2

(12) United States Patent
Soelberg et al.

(10) Patent No.: US 8,565,780 B2
(45) Date of Patent: Oct. 22, 2013

(54) CALLER IDENTIFICATION WITH CALLER GEOGRAPHICAL LOCATION

(75) Inventors: Emily Lyons Soelberg, Atlanta, GA (US); Satin S. Brennan, Redmond, WA (US); Dolores Deanna Garcia, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1062 days.

(21) Appl. No.: 12/021,913

(22) Filed: Jan. 29, 2008

(65) Prior Publication Data

US 2009/0186629 A1 Jul. 23, 2009

Related U.S. Application Data

(60) Provisional application No. 61/021,770, filed on Jan. 17, 2008.

(51) Int. Cl.
*H04W 24/00* (2009.01)
*H04M 11/04* (2006.01)
*H04M 11/10* (2006.01)
*H04M 3/42* (2006.01)
*G08B 1/08* (2006.01)
*G08B 1/00* (2006.01)

(52) U.S. Cl.
USPC .............. 455/456.1; 455/457; 455/404.2; 455/415; 455/413; 340/539.13; 340/539.2

(58) Field of Classification Search
USPC ........... 455/456.1, 457, 404.2, 445, 466, 415, 455/413; 340/539.11, 539, 13, 539.2
See application file for complete search history.

(56) References Cited

U.S. PATENT DOCUMENTS

| 7,085,578 | B2 * | 8/2006 | Barclay et al. ................. 455/457 |
| 7,330,112 | B1 * | 2/2008 | Emigh et al. ............. 340/539.13 |
| 2001/0034237 | A1 * | 10/2001 | Garahi ........................ 455/456 |
| 2004/0097243 | A1 * | 5/2004 | Zellner et al. .............. 455/456.1 |
| 2005/0169446 | A1 * | 8/2005 | Randall et al. ............. 379/93.23 |
| 2008/0070593 | A1 * | 3/2008 | Altman et al. ................. 455/457 |
| 2008/0171555 | A1 * | 7/2008 | Oh et al. ..................... 455/456.1 |
| 2008/0182598 | A1 * | 7/2008 | Bowman ..................... 455/466 |
| 2008/0242283 | A1 * | 10/2008 | Ruckart ...................... 455/415 |
| 2011/0237279 | A1 * | 9/2011 | Boudreau et al. ............. 455/457 |

OTHER PUBLICATIONS

Lendino, Jamie., "Google Maps for Mobile", PC Magazine review, Mar. 2007.*

* cited by examiner

*Primary Examiner* — Opiribo Georgewill
(74) *Attorney, Agent, or Firm* — Woodcock Washburn LLP

(57) ABSTRACT

Caller identification with caller geographical location is provided. The caller's geographical location represents the actual or approximate geographical location of the caller at the time the call is placed rather than the billing or exchange location. Additional information can be requested based on the caller's geographical location, such as directions, nearby sites of interest, and traffic reports. A call recipient can request that this additional information be sent to the caller. For privacy purposes and security, a caller can limit the amount of information that is transmitted to call recipients.

24 Claims, 9 Drawing Sheets

CALLER IDENTIFICATION WITH CALLER GEOGRAPHICAL LOCATION

CROSS-REFERENCE TO RELATED APPLICATIONS

This application claims the benefit of priority to U.S. Provisional Application No. 61/021,770, filed Jan. 17, 2008, the entirety of which is incorporated herein by reference herein.

TECHNICAL FIELD

The technical field generally relates to communications systems and more specifically relates to a system for providing caller identification with caller geographical location information.

BACKGROUND

When a call recipient receives a phone call, the recipient often asks the caller his or her geographical location. Such an inquiry is especially common when the caller and the recipient are planning to meet, or when one or both parties are trying to get to a specific geographical location. Additionally, the call recipient or the caller may wish to obtain additional information about the geographical location of the caller, such as directions to the location, nearby attractions, or traffic or weather conditions in the area. Current technologies do not provide a caller's current geographical location to a call recipient, nor do they provide a means for obtaining additional information about the caller's geographical location based upon the geographical location provided to a call recipient.

SUMMARY

Caller geographical location information is provided to a call recipient. The call recipient may be receiving a voice call, a text message, an email, a push-to-talk ("PTT") message, or any other form of communication from the caller. The caller's geographical location information can be determined by various means known to those skilled in the art, and may be determined by the caller's device, the network, or some other device or means. In an example configuration, further information is available based on the caller's geographical location, which may include, but is not limited to, directions, maps, traffic conditions, weather reports, and attractions near the caller. This information may be accessed by the call recipient through a device receiving the caller geographical location, and/or may be forwarded to the caller from the recipient's device. In another example embodiment, the caller may control whether the caller geographical location information is provided to a particular call recipient, or to what degree of specificity caller geographical location information is provided.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. It should be understood that the explanations illustrating data or signal flows are only exemplary. The following description is illustrative and non-limiting to any one aspect.

A phone call or other telecommunications message recipient may find it very useful if he or she is provided with geographical location information and other information that may be available about the caller and the location of the calling device. In one non-limiting embodiment of the present subject matter, the actual or approximate location of the calling mobile device, and thus the caller's location, is displayed along with caller identification information. Actual or approximate geographical location information may be provided in the place of traditionally displayed caller identification information, like the caller's name, phone number, or billing location, or geographical location information may be provided in addition to such information.

Figure 1:
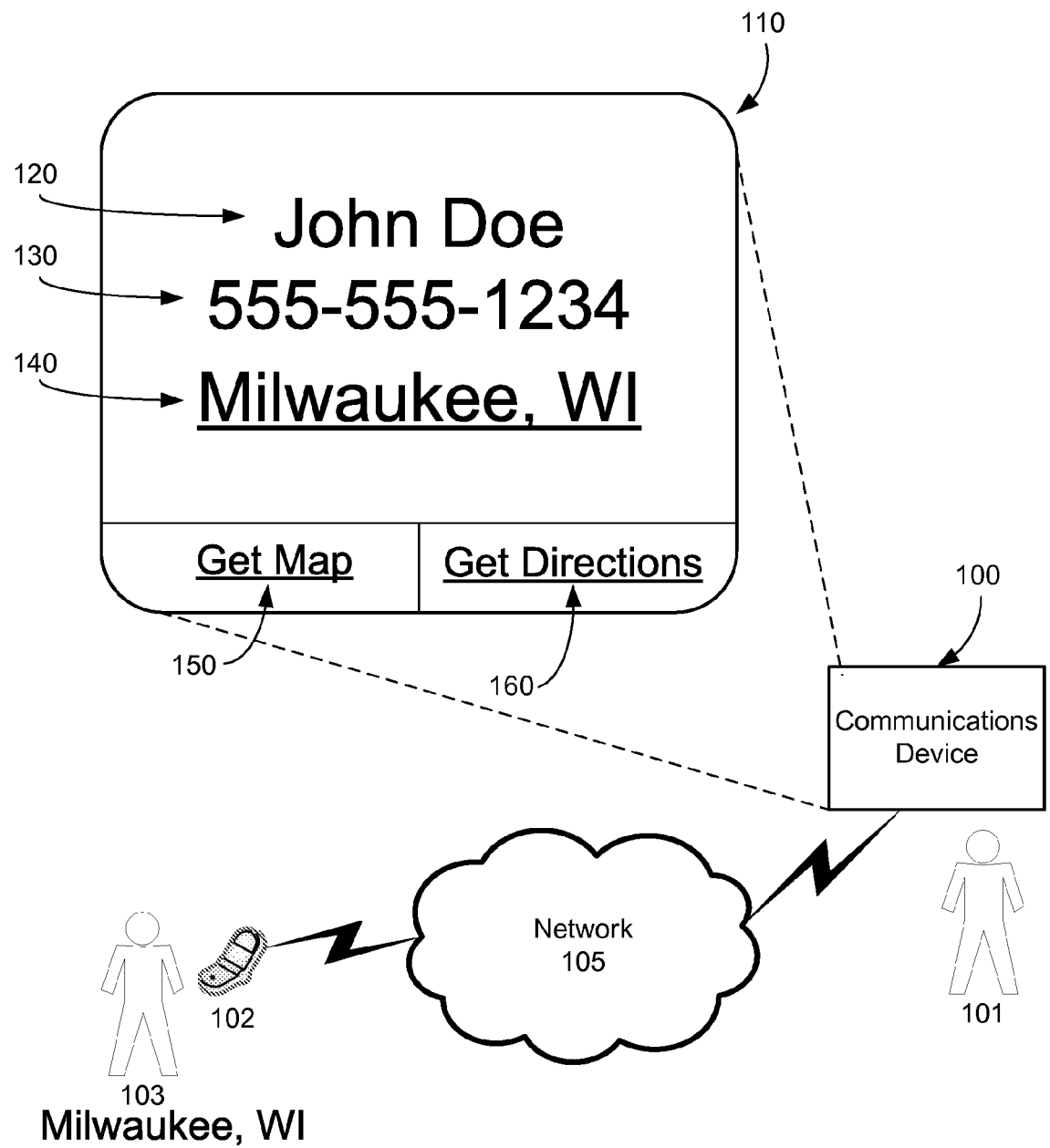
FIG. 1 is a block diagram of an example of displaying caller identification with caller geographical location information on a mobile device.

FIG. 1 illustrates an exemplary, non-limiting mobile device on which one embodiment of the present disclosure may be displayed. Recipient 101 operating recipient communications device 100 receives a communication from caller 103, who is using caller mobile device 102 to place the call. Recipient communications device 100 may be any device capable of receiving a communication from another device. Examples of such devices include, but are not limited to, wireless communications devices such as mobile telephones, mobile computers, personal data assistants (PDAs), and wirelessly networked computers, and wired communications devices such as computers, televisions, telephones. Any device which can communicate with any other device is contemplated as being within the scope of the present disclosure.

The communication is connected through network 105. Network 105 may be any network capable of providing telecommunications services, including, but not limited to, a cellular telephone network, a data network, the Internet, a public network, a private network, or any combination of these or any other type of network capable of providing telecommunications services. In this example, caller 103 is geographically located in Milwaukee, Wis. When the call is connected, caller identification data for caller mobile device 102 is sent to recipient communications device 100 over network 105 and displayed on recipient communications device display 110. Whereas the information typically displayed on a communications device may be only caller 103's number and name or billing location or exchange location, in this embodiment, caller 103's name 120, number 130, and geographical location 140 is provided to recipient 101 on recipient communications device display 110.

In another embodiment, caller 103 sends a text message or an instant message to recipient communications device 100. Caller identification with caller geographical location information is provided with the text message. In yet another embodiment, caller 103 sends a push-to-talk ("PTT") voice message to recipient communications device 100, which is accompanied by caller identification with caller geographical location information. In yet another embodiment, caller 103 leaves a voicemail for recipient 101 which is accessed with recipient communications device 100, and when accessed, the voicemail is presented accompanied by caller identification with caller geographical location information. In yet another embodiment, caller 103 sends recipient 101 an email which is received and viewed on recipient communications device 100. In this embodiment, the email is accompanied by caller identification with caller geographical location information. Any other means of communication which are capable of being accompanied by or associated with caller identification with caller geographical location information are contemplated as within the scope of the present disclosure.

For a land-line based caller, geographical location and billing or exchange location which may traditionally accompany called identification information may be the same as the caller's geographical location. However, this may not be the case. Moreover, mobile devices, which are becoming ubiquitous in developed countries, by their nature may be used anywhere they can obtain connectivity. Thus, the location that may have been traditionally displayed with caller identification information, which is usually associated with a mobile caller's billing address or perhaps the point of origin for the mobile device such as the city in which it was first purchased or activated, is often not accurate as to the caller's current geographical location. Thus, in one embodiment, the present subject matter provides the caller's geographical location along with the caller identification information.

Geographical location 140 may be an actual location or an approximate location. The degree of accuracy of the displayed location relative to the actual location of the calling device may be affected by the means with which the location is determined. One way to determine geographical location is through the use of cellular tower identification information. Typically, a mobile device uses a single cellular tower as a primary means of connectivity to the cellular network. In one embodiment, the location of that tower may be used to derive the location information provided with caller identification data. The cellular tower in use by caller mobile device 102 may be identified by various means known to those skilled in the art. This identifying information may be translated or modified as necessary, and then included in the caller identification information.

In another embodiment, triangulation may be used to determine the calling device's location. Triangulation may use time delays between caller mobile device 102 and two or more cellular towers to determine a relatively precise location for caller 103. The various means and methods of triangulation and the use of time delay and/or signal strength to determine the geographical location of a mobile device are well known to those skilled in the art, and therefore will not be recited herein. In this embodiment, once the location is determined using methods of triangulation, it can then be used, after translation or modification as necessary, to provide geographical location 140 for caller 103.

In yet another embodiment, global positioning system ("GPS") coordinates may be used to determine the geographical location of caller mobile device 102. Many mobile devices today are manufactured with GPS components. These devices use the GPS to determine their own locations with relative precision. This information can then be derived from a calling mobile device through means and methods known to those skilled in the art. Thus, if caller mobile device 102 contains GPS capabilities, it can provide its own GPS coordinates as part of the call connection procedure. Components within network 105 may actively solicit location information from caller mobile device 102, or caller mobile device 102 may automatically include such information when requesting a connection to another mobile device. Any other means or mechanisms for determining the geographical location of caller mobile device 102 are contemplated as within the scope of the present disclosure.

In the event of a land-line caller placing a call to a call recipient, the geographical location may be preset by the network operator or the land-line caller when the land-line is installed or at a later time, such as when a geographical location information service is requested. Other means of setting the geographical location for a land-line caller are contemplated as within the scope of the present disclosure.

Regardless of the means or method by which the geographical location of caller mobile device 102 is determined, the actual processing required to make the determination may be performed on caller mobile device 102, on one or more pieces of network equipment within network 105, on any other equipment capable of making the determination of a device's geographical location, or any combination thereof.

By using geographical location information obtained about or from caller mobile device 102, even if caller 103 lives in Chicago and has a Chicago billing address, because caller 103 and caller mobile device 102 are located in Milwaukee, the caller identification information displayed on recipient communications device display 110 shows his current geographical location 140. Geographical location 140 may take any form which facilitates the utility of the present subject matter. In FIG. 1, geographical location 140 includes the city and state of the caller 103's geographical location. In other embodiments, geographical location 140 may include a zip code, an intersection, an address, a landmark, a public or private facility, or any other geographical or location identifying information, or any combination or multiples thereof. Any such information may be included in the geographical location information, and any location information that is obtainable and capable of being displayed on a communications device is contemplated as within the scope of the present disclosure.

The presence of geographical location information in caller identification data may facilitate other features and services. On communications devices that are appropriately equipped, these additional services and features may be accessed, executed, or otherwise activated while a voice call is in progress. Alternatively, these services and features may be accessed, executed, or otherwise activated before or after a voice call or before or after any other form of telecommunications message is sent or received. To access additional services and features, in one embodiment, a user may access the caller identification with caller geographical location information from the call logs or message logs contained on a communications device at some point after the call was completed or message received, and then activate related services and features.

In one embodiment, additional features may be accessed through virtual or actual buttons on a mobile device. In FIG. 1, virtual buttons 150 and 160 provide access to additional services related to geographical location 140. These buttons may be clicked or otherwise activated by the controls of recipient communications device 100 in any manner or means known to those skilled in the art. Virtual button 150 may execute an application loaded on recipient communications device 100 that displays a map of the area in which geographical location 140 is located. The displayed map may be of any type that is helpful to a recipient or a caller, including a road map and a map of local businesses and sites of interest. The map may be updated in real-time or near real-time, showing the location of the caller as the caller travels. This may be useful for tracking a moving caller. A background map may also be displayed, perhaps by default, behind the caller identification information highlighting the current location of the caller. This background map may be semi-transparent so that the full map is visible while also allowing visibility to the caller identification information. Alternatively, it may be in a separate section from the caller identification information, or it may be solid and only in the background, partially obscured by the caller identification information. Means and methods of generating and displaying a map based on a geographical location are known to those skilled in the art and are contemplated as within the scope of the present disclose.

Figure 2:
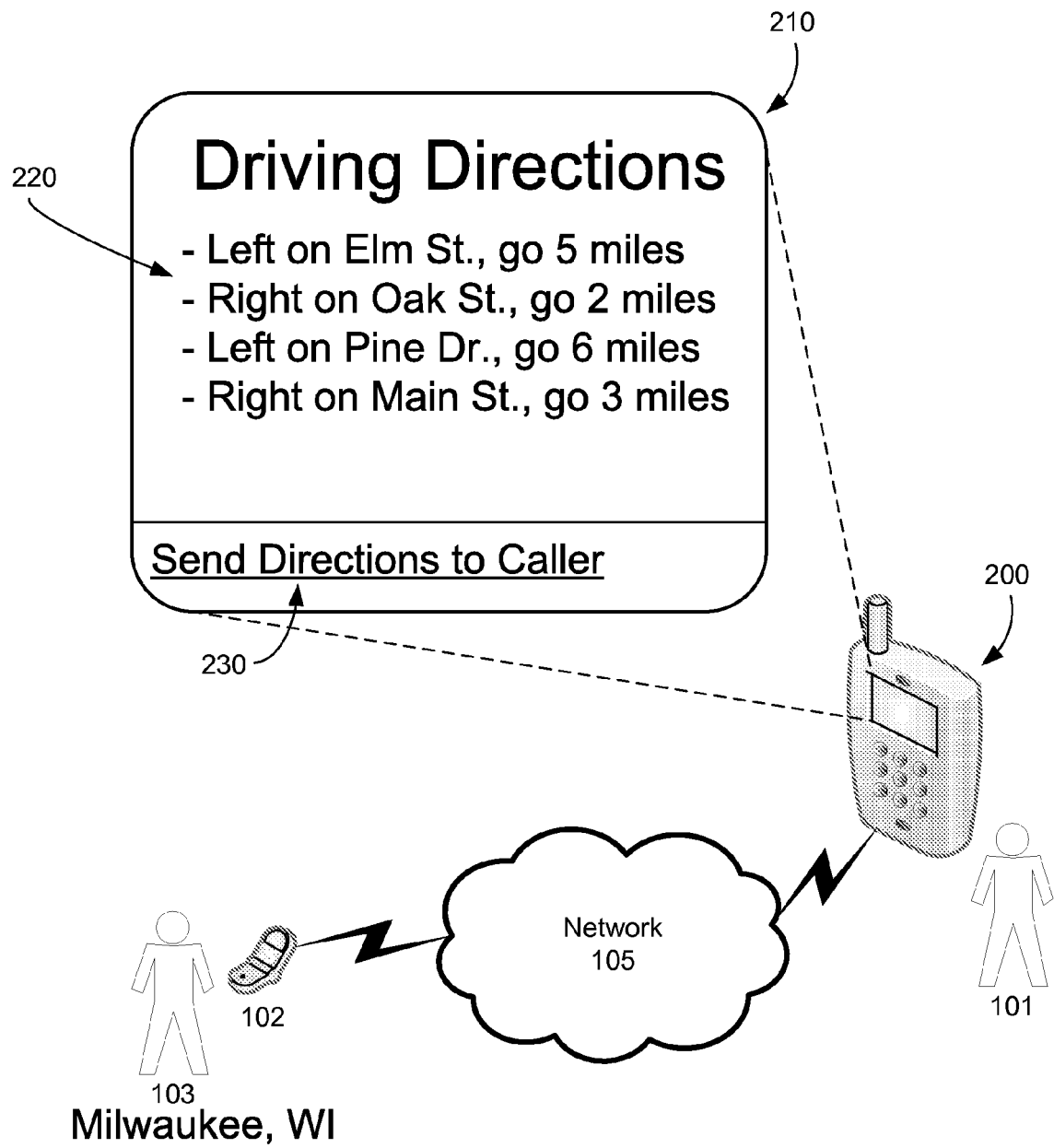
FIG. 2 is a block diagram of an example of displaying directions based on caller geographical location information provided with caller identification information.

Virtual button 160 may display directions. FIG. 2 illustrates one non-limiting exemplary embodiment of the present disclosure where the communications device in use by recipient 101 is recipient mobile device 200. Directions 220 are displayed on recipient mobile device display 210 following the activation of virtual button 160 (see FIG. 1). Directions 220 may be directions from the location of recipient mobile device 200 as determined by recipient mobile device 200 to the location described in geographical location 140. In order to generate directions from recipient mobile device 200 to geographical location 140, recipient mobile device 200 may determine its own location by any of the means described herein in regard to caller mobile device 102, or by any other means known to those skilled in the art. Directions 220 may be in the form of a map, turn-by-turn directions, or any other form of directions or combination thereof which may be useful in guiding a person from one location to another. Directions 220 may also be provided by a navigation application integrated into recipient mobile device 200, and may be provided in conjunction with an animated map and/or turn-by-turn audible directions. This may be especially helpful when using directions 220 for driving. All such directions are contemplated as within the scope of the present disclosure.

In yet another embodiment, clicking on virtual button 160 (see FIG. 1) may provide directions from geographical location 140 to recipient mobile device 200's location. These directions may be useful to some users, for example, if recipient 101 wants to tell caller 103 how to get to recipient 101's location.

In another embodiment, the usefulness of directions from caller 103 to recipient 101 may be increased if an option is provided to send such directions to caller 103. In FIG. 2, virtual button 230 enables recipient 101 to send directions 220 to caller mobile device 102 using recipient mobile device 200. Directions 220 may be sent by any means which can effectively convey them to another device, including via email, a text message, or a voice message. Then, caller 103 can view the directions on caller mobile device 102 and use them to get to recipient 101's location. Directions sent to caller 103 may be of any of the types of directions listed herein, including turn-by-turn directions, a map, or audible turn-by-turn directions. In another embodiment, an option is provided whereby directions are sent directly to caller 103 and not displayed at all on recipient mobile device 200.

In one embodiment, referring again to FIG. 1, geographical location 140 itself is a hyperlink or a button. In appropriately constructed mobile devices, geographical location 140 may be clicked or otherwise activated to initiate or execute an application or access further data. For example, clicking on geographical location 140 may display a map of the location described by geographical location 140. Alternatively, activating geographical location 140 may have the same functionality as that described herein in regard to virtual button 160, providing directions in various possible forms and with various ways of communicating such directions to either the recipient, caller 103, or both.

Figure 3:
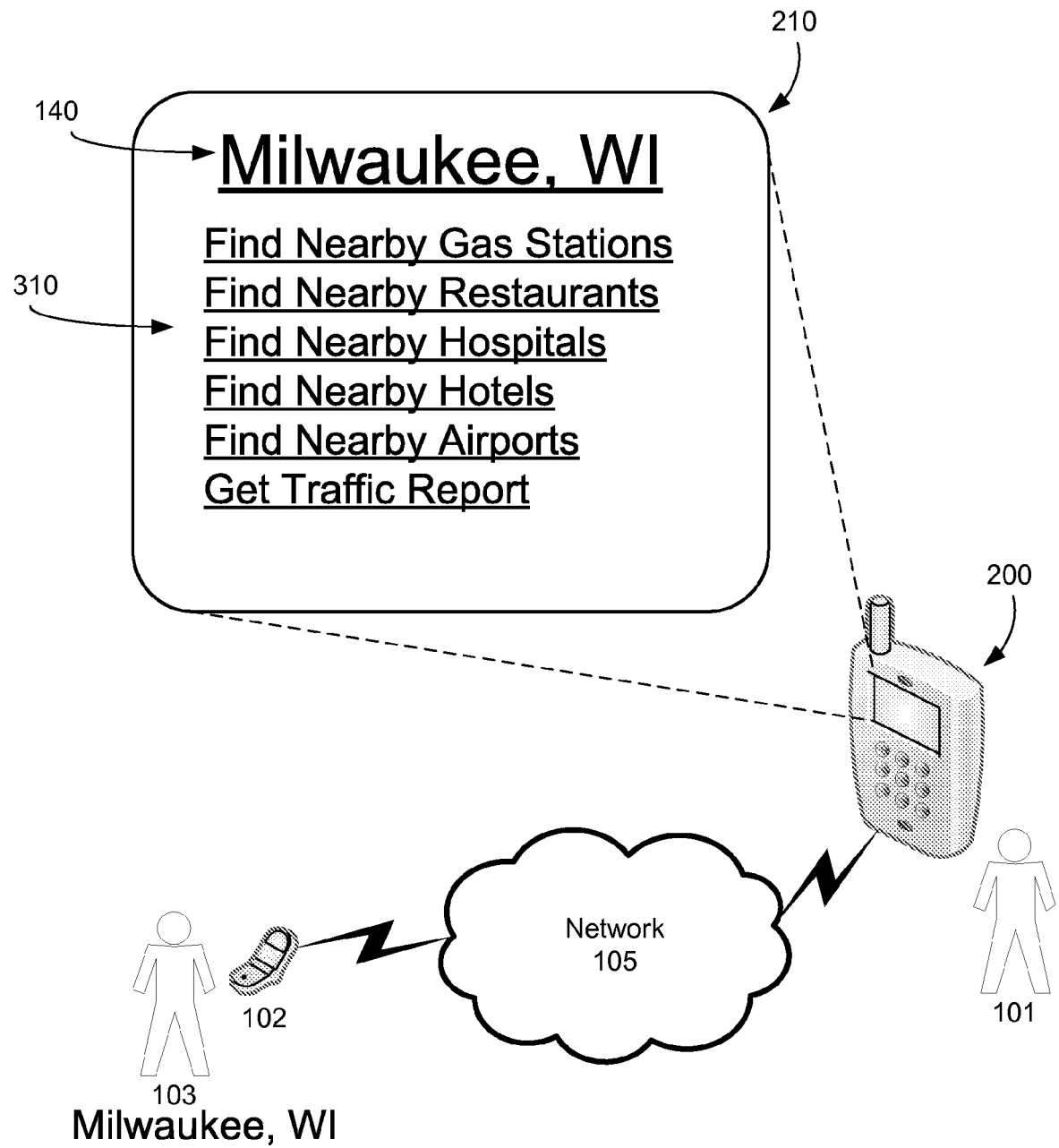
FIG. 3 is a block diagram of an example displaying options that may be provided for caller geographical location information provided with caller identification information.

In yet another alternative, clicking on geographical location 140 may execute a program that lists further options. These options may be accessed by clicking or activating other virtual or actual buttons or inputs. Referring now to FIG. 3, recipient mobile device display 210 is shown displaying options 310 as a result of activating geographical location 140 in this embodiment. Options 310 provide further selectable options, each of which provides more specific information related to geographical location 140. Any option that may be useful may be available, including locating gas stations, restaurants, hospitals, hotels, airports, or any other site or address that may be nearby or relevant to geographical location 140. Traffic reports or weather conditions may also be requested as an option, which may be provided specifically for the geographical location as described in the caller identification information. Once an option is activated, directions may be provided from caller 103 or recipient 101 to the location associated with the option in any form discussed herein, or in any other form that may be useful. Alternatively, maps or addresses may be provided, further location information may be provided, web pages may be retrieved, applications may be executed, or any other information which may be useful may be generated and/or displayed. All such information that may be presented related to a site of interest is contemplated as within the scope of the present disclosure.

As with the directions described in FIG. 2, the information provided by the options in FIG. 3 may also be sent to caller 103, in any manner described herein in regard to FIG. 2, or any other effective manner. The information provided by the option may be displayed on recipient mobile device 200 as well as caller mobile device 102, or the information may just be sent to caller mobile device 102.

In another embodiment, one of the features available to recipient 101 is obtaining current geographical location for a caller after the call is complete. Recipient 101 may access the caller identification information with caller 103's geographical location information from a call log, and select an option for finding the current geographical location of caller 103. This may be performed through the use of a virtual or actual button, hyperlinked portion of the caller identification information, or any other means capable of accessing current geographical location information for a previous caller. Caller 103's current geographical location information may be determined through any of the means listed herein, and any methods and means of obtaining the location of a mobile device may be used and are contemplated as within the scope of the present disclosure.

The functionality enabled by the presentation of caller identification with caller geographical location information may also be available to land-line recipients. Today, telecommunications systems are available which integrate telephone and data services, including cable television, into a single communications link. Such links are typically terminated at a location with a device the splits or otherwise separates the signals that provide the various telecommunications services and directs the signals to the appropriate devices. Interaction between services is possible and becoming more common.

Figure 4:
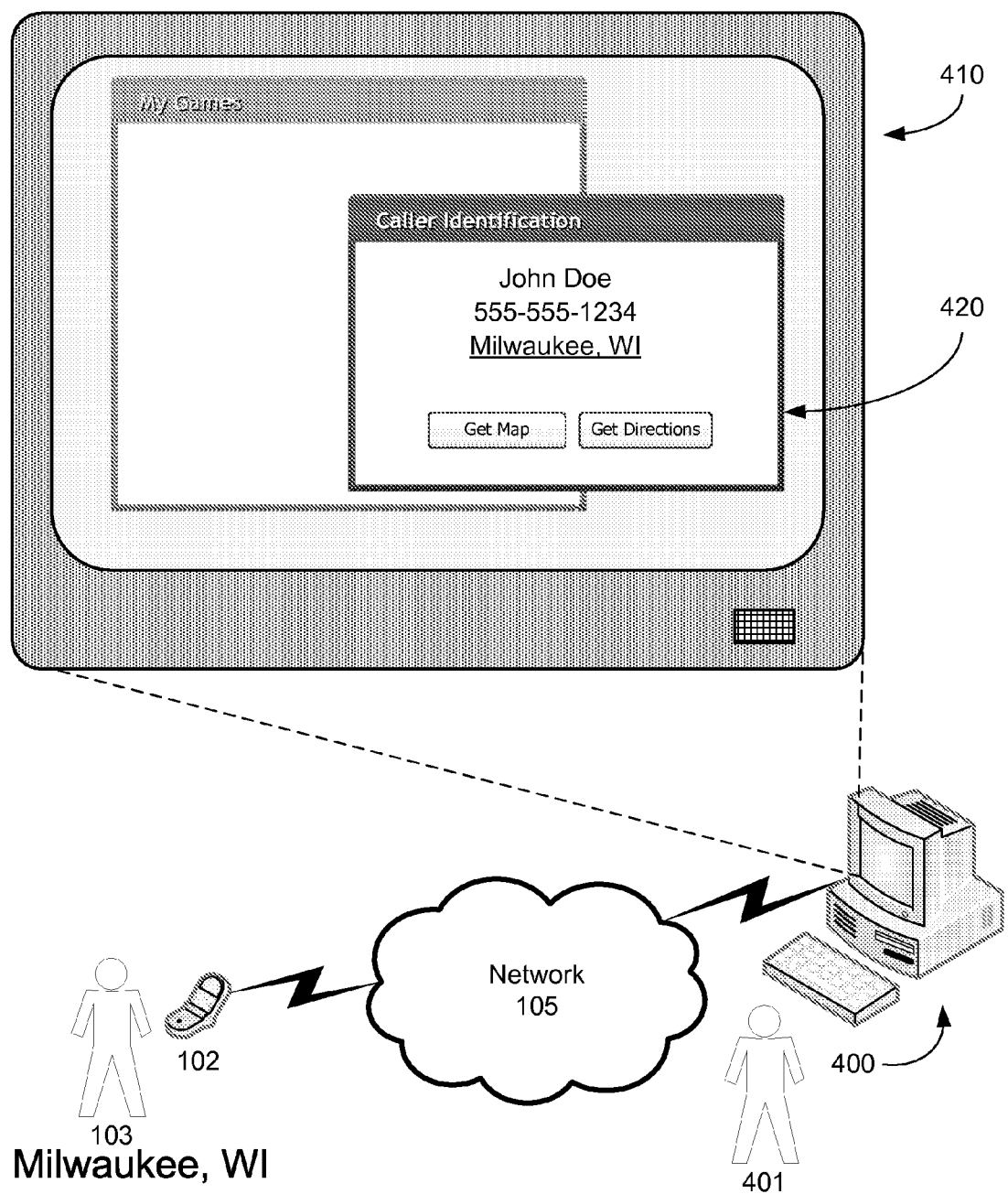
FIG. 4 is a block diagram of an example of displaying caller identification with caller geographical location information on a computer.

FIG. 4 illustrates one non-limiting exemplary embodiment of the present disclosure where caller identification information with caller geographical location information is presented to a land-line user. Land-line recipient 401 operates recipient computer 400 which is connected to network 105. Network 105 provides telephone and data services to land-line recipient 401. Recipient computer 400 is equipped with recipient computer display 410. When caller 103 makes a call to land-line recipient 401 with caller mobile device 102, the caller identification information may be presented to the land-line user in caller identification window 420. The information that may be displayed in caller identification window 420 may be similar to that seen in recipient communications device display 110 of FIG. 1. Alternatively, other information may be displayed in caller identification window 420, or the information displayed may be arranged differently. Any arrangement or type of caller identification information is contemplated as being displayed in caller identification window 420.

Caller identification window 420 may provide options similar to those described herein with regard to FIGS. 1-3. For example, buttons may be available in caller identification window 420 to generate a map of the caller 103's location, or directions to caller 103 from a specific starting point. Alternatively, other buttons or links may be provided, either directly or by clicking through another window, which provide additional information about the caller 103's location. This information may include lists of sites of interest, traffic reports, weather conditions, and directions to nearby sites such as gas stations, restaurants, hospitals, hotels, airports, or any other site that may be nearby or relevant to caller 103's location. Such buttons may also retrieve web pages related to requested information or execute programs or applications which generate and/or present the requested information. Any other means or methods of retrieving any information related to caller 103's location are contemplated as within the scope of the present disclosure.

A similar exemplary embodiment to that illustrated in FIG. 4 may be implemented where the recipient has an appropriately equipped television. The caller identification information with caller geographical location information may be provided on the television display, and the recipient may access any or all of the features described herein in regard to computers and telephone devices through the television and associated equipment. Likewise, a recipient may receive caller identification information with caller geographical location information on an appropriately constructed land-line telephone, and may access any or all of the features described herein in regard to computers and mobile communications devices through the land-line telephone and associated equipment. Any device that is capable of receiving caller identification information with caller geographical location information and implementing the subject matter described herein is contemplated as within the scope of the present disclosure.

Callers may wish to maintain some control over who sees the caller geographical location information for privacy or other reasons. In one embodiment, a caller may select one or more caller identification privacy levels for a recipient. The caller may determine a privacy level for each potential call recipient in the caller's contact list stored on the caller's mobile device. Alternatively, a caller may assign a particular privacy level to the entire contact list. In another alternative, the caller may create several lists of contacts, with each list having a specific caller identification privacy level assigned. In yet another alternative, a caller may select the privacy level for the recipient of a call before or at the time of placing the call. Any combination of these means of assigning a caller identification privacy level to a recipient, or any other means or methods of assigning caller identification privacy levels, are contemplated as within the scope of the present disclosure.

In one embodiment, a privacy level is provided which allows the caller to block all caller identification information. Recipients who are assigned to this level of privacy may get no information at all about the caller. In another embodiment, a privacy level is provided which allows the caller to block current geographical location information. Recipients who are assigned to this level may get only the caller's phone number and perhaps the caller's name and/or billing or exchange location, rather than seeing the caller's actual geographical location. In yet another embodiment, a privacy level is provided which allows only general geographical location information to be received. Recipients who are assigned this level may only get the caller location's city or state, and not more specific geographical location information. In yet another embodiment, a privacy level is provided which allows a recipient to see all the available caller identification information, including current specific geographical location.

Privacy levels may also allow the caller to limit what actions can be taken based on their transmitted caller identification with caller geographical location information. In one embodiment, where a recipient has the ability to update location information for a caller from the call logs, the caller may set a privacy level that limits the ability of a call recipient to update a caller's geographical location information. This may be a default privacy level. By using this privacy level, the caller provides a static snap-shot of his or her geographical location to users assigned to this privacy level. In another embodiment, other privacy levels may be used that limit the use of specific applications or programs based on caller geographical location information. Default caller identification privacy levels may be set on a mobile device so that any call recipient who does not have a specific caller identification privacy level associated with the recipient will be assigned to the default caller identification privacy level. Any combination of these caller identification privacy levels, or any other caller identification privacy levels and combinations thereof are contemplated as within the scope of the present disclosure.

Figure 5:
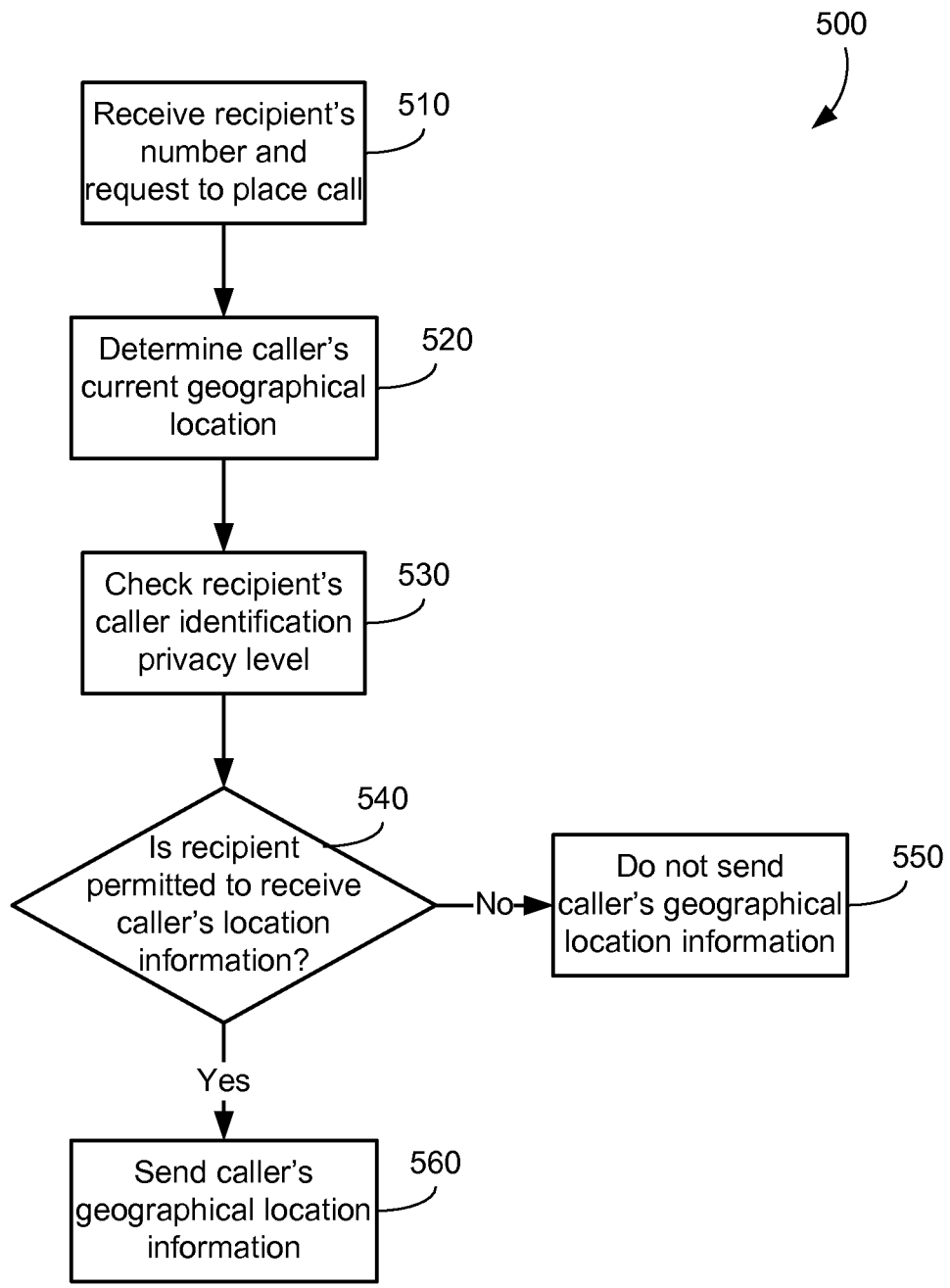
FIG. 5 is a flow diagram of an example process for providing caller geographical location.

In FIG. 5, a non-limiting exemplary method 500 of providing caller geographical location information is illustrated. Any or all portions of the exemplary method illustrated in FIG. 5 may be performed on either a communications device or on telecommunications network equipment. At block 510, a request is received to place a call along with a recipient's phone number. The request may be received on a communications device, such as a mobile telephone when a user enters a number and presses "send", or it may be received on a telecommunications network from a communications device. At block 520, the caller's current geographical location is determined. This may be accomplished by any of the means described herein, including using cellular tower identifiers, triangulations, GPS coordinates, or any other means or methods which can provide approximate or actual geographical location information for a caller and/or a communications device.

At block 530, after determining the caller's geographical location in block 520, the recipient's number is checked against any caller identification privacy level, list, or criteria that may be set. Note that determining the caller's geographical location and determining the caller identification privacy level of the recipient do not have to be performed in the order suggested in FIG. 5. For example, it may be more efficient to determine the recipient's privacy level before determining the caller's geographical location. This may improve efficiency because if the recipient is not permitted to receive the caller's geographical location due to the recipient's caller identification privacy level, the caller's geographical location may not need to be determined, thus saving resources that need not be used. In alternative implementations, the caller's geographical location information may be determined with every call placed or message transmitted, regardless of caller identification requirements or recipient caller identification privacy level. In those cases, determining the caller identification privacy level of the recipient before determining the geographical location of the caller may provide efficiency improvements.

Once the caller's geographical location and the recipient's caller identification privacy level is determined, at block 540 it is determined whether the recipient is permitted to receive the caller's geographical location information. If the recipient's caller identification privacy level does not permit the recipient to receive the caller's geographical location information, the geographical location information is withheld at block 550. If the recipient is permitted to see the caller's geographical location information, the geographical location information is provided at block 560.

Figure 6:
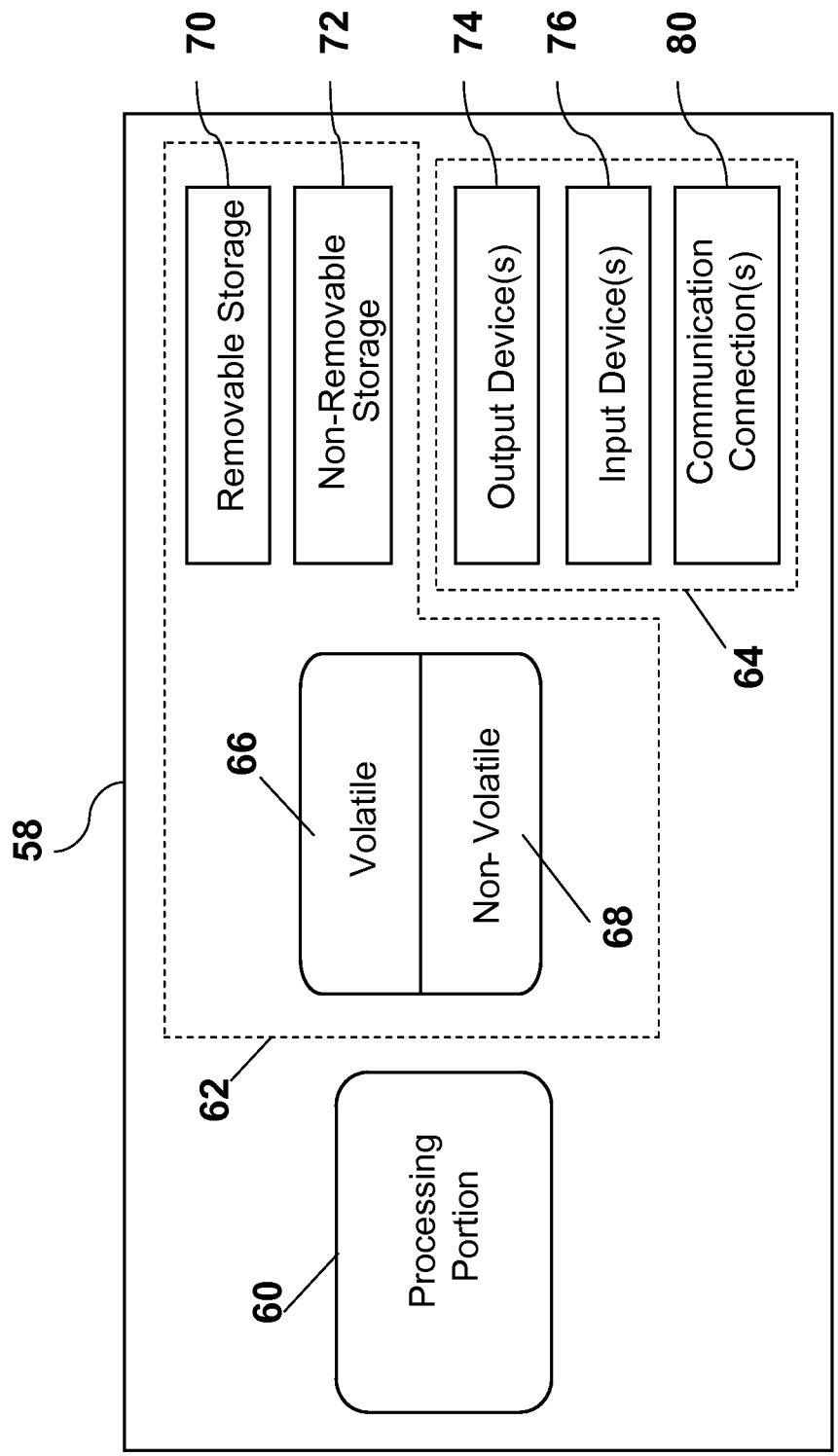
FIG. 6 is a block diagram of an example processor for generating and/or determining and transmitting and/or receiving caller identification with caller geographical location information.

FIG. 6 is a block diagram of an example processor 58 for generating and/or determining and transmitting and/or receiving caller identification data including geographical location information. In an example configuration, the processor 58 may be one component of caller mobile device 102, recipient communications device 100, recipient mobile device 200, recipient computer 400, or a combination thereof. It is emphasized that the block diagram depicted in FIG. 6 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications therebetween. The input/output portion 64 is capable of providing and/or receiving components utilized to determine or generate caller identification information and transmit or receive such information as described above. For example, the input/output portion 64 is capable of providing/receiving caller identification geographical location information, determining the caller identification privacy level of a recipient, transmitting/receiving caller identification geographical location information, processing requests for additional information based upon the caller's geographical location information, executing programs and applications upon request of a recipient based upon the caller's geographical location information, or any combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with generating/determining and/or receiving/transmitting caller identification information. For example, as described above, the memory portion is capable of storing one or more lists of a recipients, one or more caller identification privacy levels, applications and software to generate or retrieve information related to a caller's geographical location, or any combination thereof. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain the communications connection(s) 80 that allow the processor 58 to communicate with other devices, for example through network 105. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 58 also can have input device(s) 76 such as keyboard, keypad, mouse, pen, voice input device, touch input device, etc. Output device(s) 74 such as a display, speakers, printer, etc. also can be included.

The following description sets forth some exemplary telephony radio networks and non-limiting operating environments in which caller identification and caller geographical location information can be implemented. The below-described operating environments should be considered non-exhaustive, however, and thus the below-described network architectures merely show how caller identification with caller geographical location information can be incorporated into existing network structures and architectures. It can be appreciated, however, that caller identification with caller geographical location information can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS channel assignment can be applied independently of the method for data transport, and do not depend on any particular network architecture, or underlying protocols.

Figure 7:
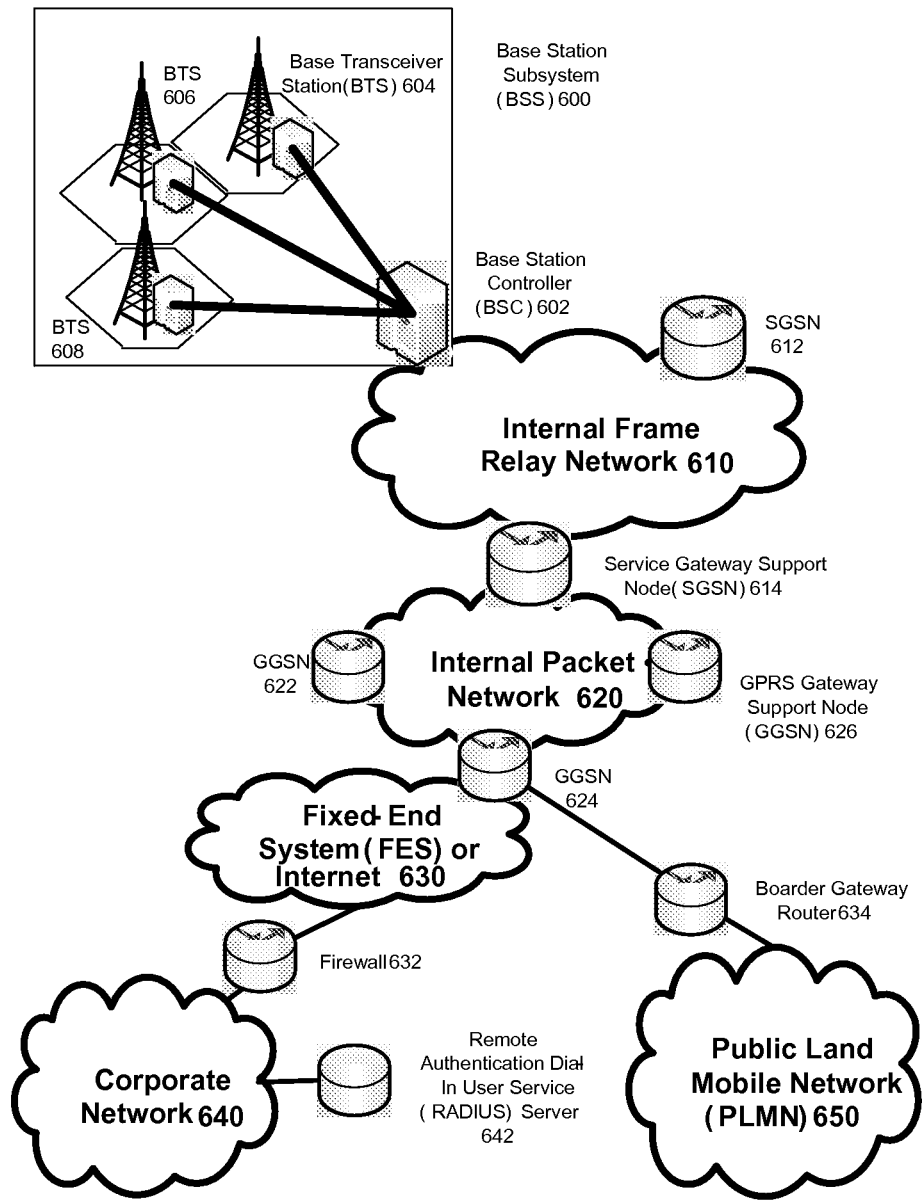
FIG. 7 is an overall block diagram of an exemplary packet-based mobile cellular network environment, such as a GPRS network, in which caller identification with caller geographical location information can be implemented.

FIG. 7 depicts an overall block diagram of an exemplary packet-based mobile cellular network environment, such as a GPRS network, in which the system for providing caller identification and caller geographical location information can be practiced. In an example configuration, network 105 comprises a cellular radio network and towers which are encompassed by the network environment depicted in FIG. 7. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614.

Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 8:
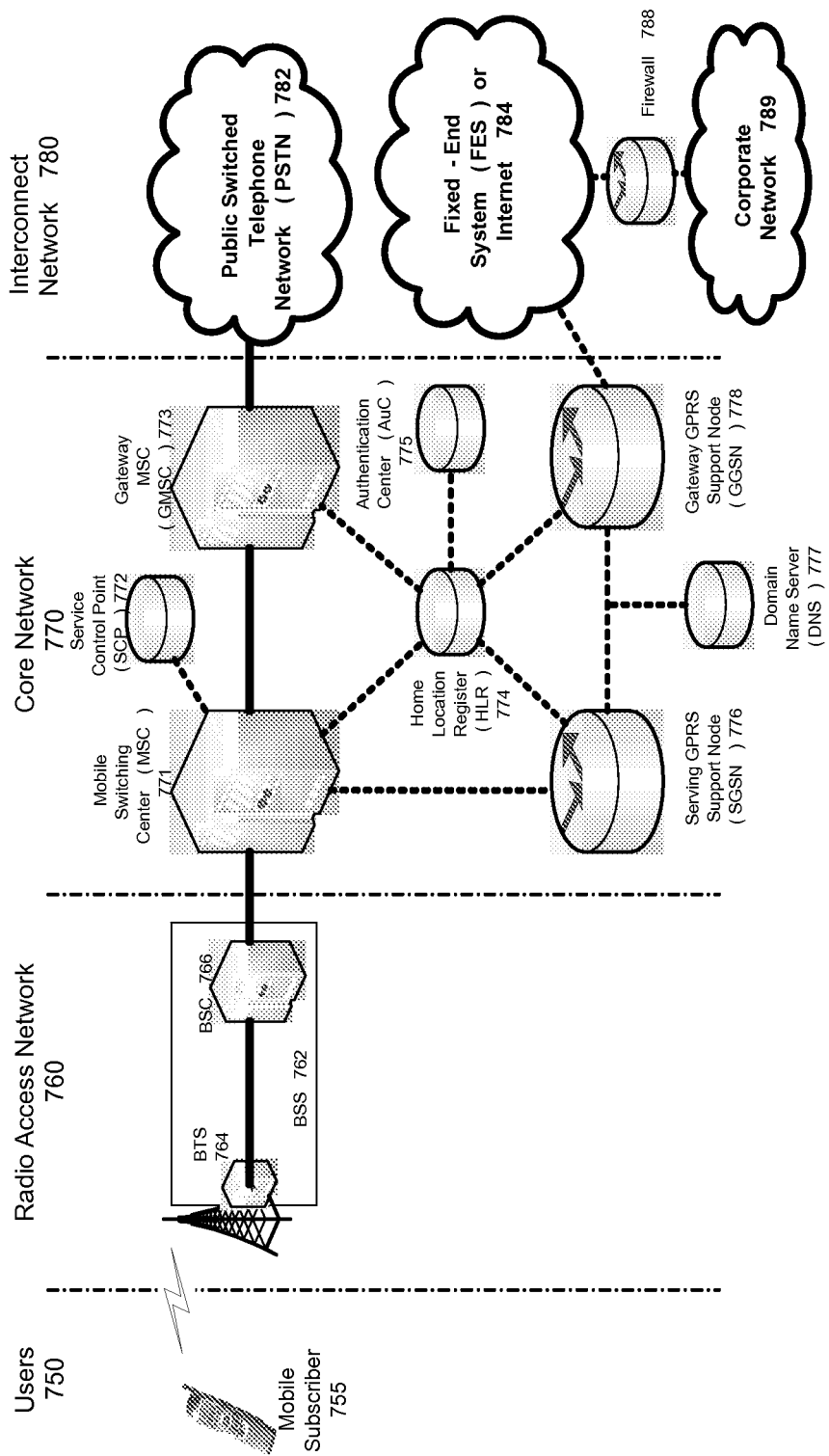
FIG. 8 illustrates an architecture of a typical GPRS network as segmented into four groups.

FIG. 8 illustrates an architecture of a typical GPRS network as segmented into four groups: users 750, radio access network 760, core network 770, and interconnect network 780. In an example configuration, network 105 is encompassed by the radio access network 760, core network 770, and interconnect network 780. Users 750 comprise a plurality of end users (though only mobile subscriber 755 is shown in FIG. 8). In an example embodiment, the device depicted as mobile subscriber 755 comprises caller mobile device 102. In an alternate embodiment, the device depicted as mobile subscriber 755 comprises recipient mobile device 200. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 8, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, such as caller 103 or recipient 101, and sometimes to the actual portable device, such as caller mobile device 102, recipient communications device 100, or recipient mobile device 200, used by an end user of the mobile cellular service. When a mobile subscriber turns on his or her mobile device, the mobile device goes through an attach process by which the mobile device attaches to an SGSN of the GPRS network. In FIG. 8, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (identification) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 8) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of caller identification with caller geographical location information can include but are not limited to Gateway GPRS Support Node tables, Fixed End System router tables, firewall systems, VPN tunnels, and any number of other network elements as required by the particular digital network.

Figure 9:
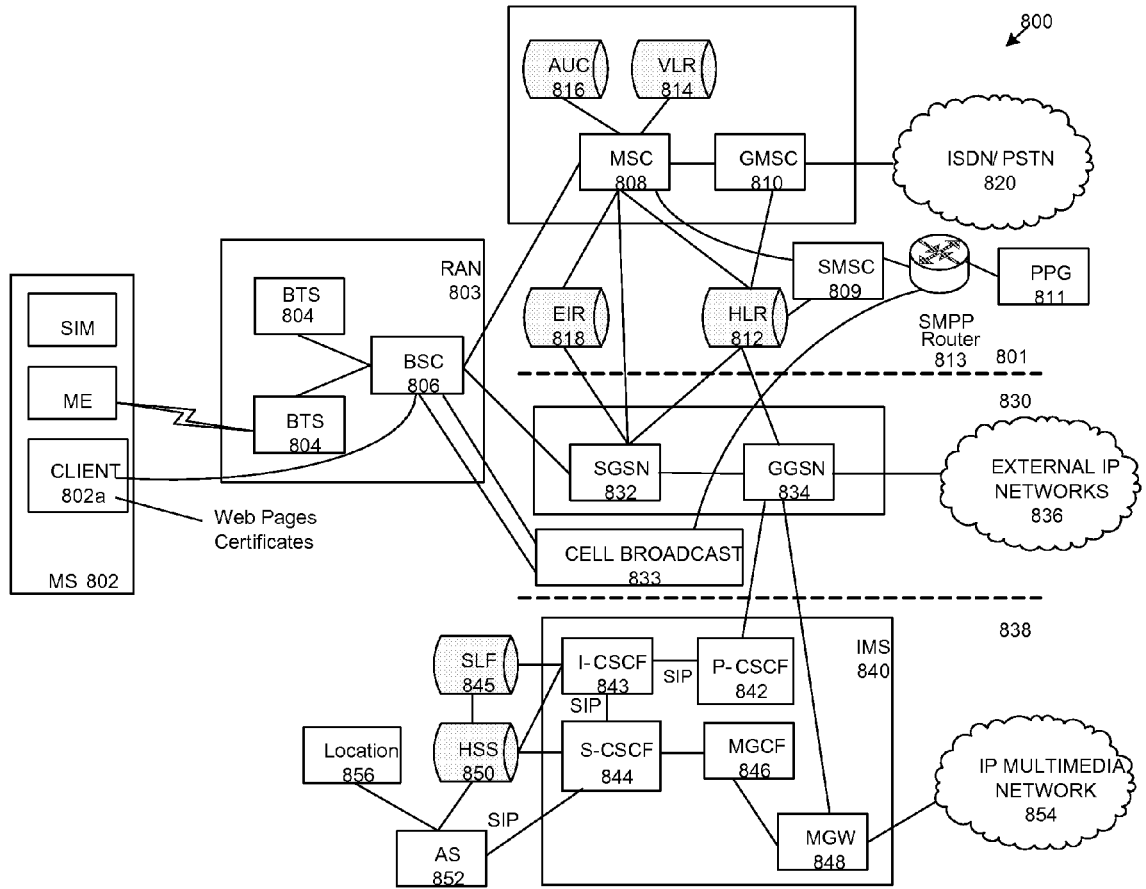
FIG. 9 illustrates an example alternate block diagram of an exemplary GSM/GPRS/IP multimedia network architecture in which caller identification with caller geographical location information can be implemented.

FIG. 9 illustrates another exemplary block diagram view of a GSM/GPRS/IP multimedia network architecture 800 in which caller identification with caller geographical location information can be incorporated. As illustrated, architecture 800 of FIG. 9 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AUC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification.)

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown.) It also controls the media gateway (MGW) 848 that provides user-plane interworking functionality (e.g., converting between AMR- and PCM-coded voice.) The MGW 848 also communicates with other IP multimedia networks 854.

Push to Talk over Cellular (PoC) capable mobile phones register with the wireless network when the phones are in a predefined area (e.g., job site, etc.) When the mobile phones leave the area, they register with the network in their new location as being outside the predefined area. This registration, however, does not indicate the actual physical location of the mobile phones outside the pre-defined area.

While example embodiments of caller identification with caller geographical location information have been described in connection with various computing devices, the underlying concepts can be applied to any computing device or system capable of implementing caller identification with caller geographical location information. The various techniques described herein can be implemented in connection with hardware or software or, where appropriate, with a combination of both. Thus, the methods and apparatus for generating, transmitting, receiving, and/or implementing caller identification with caller geographical location information, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing predetermined emergency alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for caller identification with caller geographical location information also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing caller identification with caller geographical location information. When implemented on a general-purpose processor, the program code combines with the processor to provide a unique apparatus that operates to invoke the functionality of EAS channel assignment. Additionally, any storage techniques used in connection with caller identification with caller geographical location information can invariably be a combination of hardware and software.

While caller identification with caller geographical location information has been described in connection with the various embodiments of the various figures, it is to be understood that other similar embodiments can be used or modifications and additions can be made to the described embodiment for performing the same function of providing caller identification with caller geographical location information without deviating therefrom. For example, one skilled in the art will recognize that a system for implementing caller identification with caller geographical location information as described may apply to any environment, whether wired or wireless, and may be applied to any number of devices connected via a communications network and interacting across the network. Therefore, caller identification with caller geographical location information should not be limited to any single embodiment, but rather should be construed in breadth and scope in accordance with the appended claims.

What is claimed:

1. A method comprising:
receiving, on a wireless communications device, caller identification information for a communication initiated from a caller's wireless communications device to the wireless communications device, wherein the caller identification information comprises an identifier of a caller's geographical location;
presenting the identifier of the caller's geographical location as a user-selectable control comprising a text descriptor of the caller's geographical location on the wireless communications device; and
in response to detecting a user selection of the user-selectable control:
determining, on the wireless communications device, a geographical location of the wireless communications device,
determining, on the wireless communications device, audible turn-by-turn directions from the caller's geographical location to the geographical location of the wireless communications device, and
transmitting, in a voice message from the wireless communications device to the caller's wireless communications device, the audible turn-by-turn directions without audibly presenting the audible turn-by-turn directions on the wireless communications device.

2. The method of claim 1, further comprising, in response to detecting the user selection of the user-selectable control, presenting location information based on the caller's geographical location.

3. The method of claim 1, further comprising transmitting a map of an area comprising the caller's geographical location to the caller's wireless communications device.

4. The method of claim 1, further comprising providing a second user-selectable control on the wireless communications device that, when selected by a user, causes the wireless communications device to display location information based on the caller's geographical location.

5. The method of claim 1 wherein the caller's geographical location is determined by determining the global positioning system (GPS) coordinates of a caller's mobile device.

6. A mobile communications device configured to:
receive caller identification information for a communication initiated from a caller's mobile communications device to the mobile communications device, wherein the caller identification information comprises an identifier of a caller's geographical location;
present the identifier of the caller's geographical location as a user-selectable control comprising a text descriptor of the caller's geographical location; and
in response to detecting a user selection of the user-selectable control:
determine a geographical location of the mobile communications device,
determine audible turn-by-turn directions from the caller's geographical location to the geographical location of the wireless communications device, and
transmit, in a voice message to the caller's mobile communications device, the audible turn-by-turn directions without audibly presenting the audible turn-by-turn directions on the mobile communications device.

7. The mobile communications device of claim 6, wherein the mobile communications device is further configured to, in response to detecting the user selection of the user-selectable control, present location information based on the caller's geographical location.

8. The mobile communications device of claim 7, wherein the location information comprises a map of an area comprising the caller's geographical location.

9. The mobile communications device of claim 6, wherein the caller's geographical location is determined by triangulation.

10. The mobile communications device of claim 7, wherein the location information comprises a plurality of user-selectable controls for requesting additional location information.

11. A system comprising:
a memory comprising computer instructions; and
a processor coupled to the memory, wherein, when executing the computer instructions, the processor performs operations comprising:
receiving caller identification information for a communication initiated from a caller's wireless communications device, wherein the caller identification information comprises an identifier of a caller's geographical location;
detecting a user selection of a user-selectable control comprising a text descriptor of the caller's geographical location;
presenting the user-selectable control; and
in response to detecting a user selection of the user-selectable control:
determining a geographical location of the system,
determining audible turn-by-turn directions from the caller's geographical location to the geographical location of the system, and
transmitting, in a voice message to the caller's wireless communications device, the audible turn-by-turn directions without the system audibly presenting the audible turn-by-turn directions.

12. The system of claim 11, wherein the operations further comprise, in response to detecting the user selection of the user-selectable control, presenting location information based on the caller's geographical location.

13. The system of claim 11, wherein the operations further comprise transmitting a map of an area comprising the caller's geographical location to the caller's wireless communications device.

14. The system of claim 11, wherein the operations further comprise presenting a second user-selectable control that, when selected by a user, causes the system to display location information based on the caller's geographical location.

15. The system of claim 14, wherein the location information comprises directions to the caller's geographical location.

16. A non-transitory computer-readable medium having stored thereon computer-executable instructions for:
receiving caller identification information for a communication initiated from a caller's wireless communications device, wherein the caller identification information comprises an identifier of a caller's geographical location;
presenting the identifier of the caller's geographical location as a user-selectable control comprising a text descriptor of the caller's geographical location; and
in response to detecting a user selection of the user-selectable control:
determining a geographical location of a wireless communications device executing the computer-executable instructions,
determining audible turn-by-turn directions from the caller's geographical location to the geographical location of the wireless communications device, and
transmitting, in a voice message to the caller's wireless communications device, the audible turn-by-turn directions without audibly presenting the audible turn-by-turn directions on the wireless communications device.

17. The non-transitory computer-readable medium of claim 16, wherein the caller's geographical location is determined based on a cellular tower identifier.

18. The non-transitory computer-readable medium of claim 16, further comprising instructions for displaying second location information based on the caller's geographical location in response to a user selection of a second user-selectable control.

19. The non-transitory computer-readable medium of claim 18, wherein the second location information comprises a map of an area comprising the caller's geographical location.

20. The non-transitory computer-readable medium of claim 18, wherein the second location information comprises a second user-selectable control that, upon activation, determines at least one point of interest proximate to the caller's geographical location.

21. The non-transitory computer-readable medium of claim 16, further comprising instructions for, in response to detecting the user selection of the user-selectable control, presenting location information based on the caller's geographical location.

22. A method comprising:
detecting, on a wireless communications device, a selection of caller identification information associated with a terminated call from a call log, the caller identification information comprising an initial geographical location, wherein the initial geographical location is based on the location of the caller at the time of the terminated call;
requesting a current geographical location for the caller;
receiving, on the wireless communications device, location data for the caller, wherein the location data comprises the current geographical location that is based on the location of the caller at the time of the request for the current geographical location, wherein the location data comprises an identifier of the current geographical location;
presenting the identifier of the current geographical location as a user-selectable control comprising a text descriptor of the current geographical location on the wireless communications device; and
in response to detecting a user selection of the user-selectable control:
determining, on the wireless communications device, a geographical location of the wireless communications device,
determining, on the wireless communications device, audible turn-by-turn directions from the current geographical location for the caller to the geographical location of the wireless communications device, and
transmitting, in a voice message from the wireless communications device to the caller, the audible turn-by-turn directions without audibly presenting the audible turn-by-turn directions on the wireless communications device.

23. The method of claim 22, further comprising, in response to detecting the user selection of the user-selectable control, presenting location information based on the current geographical location for the caller.

24. The method of claim 23, wherein the location information comprises directions to the current geographical location for the caller.

\* \* \* \* \*